United States Patent
Montanari et al.

(10) Patent No.: US 7,833,450 B2
(45) Date of Patent: Nov. 16, 2010

(54) USE OF A MICROCRYSTALLINE POLYAMIDE TO OBTAIN A PARTICULAR SURFACE FINISH

(75) Inventors: Thibaut Montanari, Bernay (FR); Christelle Recoquille, Nassandres (FR)

(73) Assignee: Arkema France, Colombes (FR)

( * ) Notice: Subject to any disclaimer, the term of this patent is extended or adjusted under 35 U.S.C. 154(b) by 927 days.

(21) Appl. No.: 11/158,650

(22) Filed: Jun. 22, 2005

(65) Prior Publication Data

US 2006/0030692 A1    Feb. 9, 2006

Related U.S. Application Data

(60) Provisional application No. 60/603,095, filed on Aug. 20, 2004.

(30) Foreign Application Priority Data

Jun. 22, 2004    (FR)    ................................. 04 06757

(51) Int. Cl.
*C08L 77/00*    (2006.01)
*C08L 77/12*    (2006.01)
*B29D 23/00*    (2006.01)

(52) U.S. Cl. .............................. 264/211.12; 264/171.1; 264/171.23; 264/173.19; 264/175; 264/176.1; 264/177.19; 264/345; 428/474.4; 525/66; 525/179; 525/183; 525/184; 525/432

(58) Field of Classification Search .............. 264/171.1, 264/171.23, 173.19, 175, 176.1, 177.19, 264/211.12, 345; 428/474.4; 525/66, 179, 525/183, 184, 432
See application file for complete search history.

(56) References Cited

U.S. PATENT DOCUMENTS

2002/0173596 A1    11/2002    Montanari et al.
2002/0179888 A1    12/2002    Montanari et al.

FOREIGN PATENT DOCUMENTS

EP    0628602 B1    10/2001

*Primary Examiner*—Ana L Woodward
(74) *Attorney, Agent, or Firm*—Thomas F. Roland

(57) ABSTRACT

The present invention relates to the use of a microcrystalline polyamide for obtaining an object having all or part of its outer surface formed from this microcrystalline polyamide and having a particular surface finish, in which:

the manufacture of the object comprises steps carried out hot between the $T_g$ (glass transition temperature) and the $T_m$ (melting point) of this microcrystalline polyamide;

the transparency of the microcrystalline polyamide is such that the light transmission at 560 nm on a polished object 1 mm in thickness is greater than 80%, advantageously greater than 88%, the transparency being measured on the object obtained by standard processing methods, such as injection moulding and sheet extrusion/calendering.

17 Claims, 1 Drawing Sheet

USE OF A MICROCRYSTALLINE POLYAMIDE TO OBTAIN A PARTICULAR SURFACE FINISH

This application claims benefit, under U.S.C. §119 or §365 of French Application Number 04.06757, filed Jun. 22, 2004; and U.S. 60/603,095 filed Aug. 20, 2004.

FIELD OF THE INVENTION

The present invention relates to the use of a microcrystalline polyamide in order to obtain a particular surface finish. More precisely, this is the use of a transparent material of a particular type, which is solid but malleable, particularly capable of reproducing the surface finishes (small-scale relief) and of being formed (large-scale relief, deep relief) and of adhering to itself or to a substrate possibly with anfractuosities, all this with the purpose of producing an object possessing aesthetic, attractive and high-quality visual and tactile properties and being resistant to mechanical, chemical and physical attack.

This may concern a compression-moulded or injection-moulded bulk object made of this microcrystalline polyamide, or the outer layer completely or partly covering an object. This outer layer may also be the outer layer of a multilayer structure that covers a substrate. The structure is also called a film or sheet when its thickness is at most around 0.5 to 1 mm. The structure consists of a single layer of a microcrystalline polyamide or the multilayer structure that includes an outer (or upper) layer, that is to say the surface layer of the object, is fixed to the object by any means. For example, the structure is placed in an injection mould, the upper layer being placed on the mould wall side, and then the substrate in the melt state is injected on the opposite side. The structure may be thermoformed before being placed in the mould. After the mould has cooled down and been opened, the substrate covered with the structure is recovered.

The microcrystalline polyamides of the invention make it possible to have an upper face that can easily render surface finishes or take a grain, that is to say is capable of becoming smooth and shiny (in contact with a sufficiently hot polished metal mould wall) or of becoming matt and grained (on contact with a sufficiently hot, matt or grained, metal mould wall), or of assuming a brushed appearance. What has just been described is merely an illustration of the principle, but it would of course not be outside the scope of the invention if the texturizing walls of the mould (or of any other texturizing device) are made of a material other than metal. Furthermore, it is very particularly one of the major advantages of the invention, namely the ability of our microcrystalline material to be capable of rendering very complex surface finishes of non-metallic materials, such as fabrics, paper, leather, wood, plants, etc. It is known that plastics are ill suited to rendering complex surface finishes. Either plastics are solid and too rigid to assume the relief sufficiently, or they are in the liquid state and adhere strongly to the surface, and it would then be impossible, once the plastic has resolidified, to strip the latter from the texturizing wall (for example made of fabric). This is because it is well known that plastics cannot in general be given very complex or very attractive surface finishes. It is known that plastics are generally regarded as materials of mediocre quality compared with more conventional materials, such as metals, fabrics, wood, leather, etc.

BACKGROUND OF THE INVENTION

The invention is the use of a particular polyamide polymer material called "microcrystalline" for the purpose of obtaining decorative and functional objects having aesthetic, attractive and high-quality visual and tactile properties.

It is also desirable for these visuo-tactile properties to be lasting when faced with mechanical (impact, scratching), chemical (solvent) and physical (UV) attack. Typically the manufacture of the object comprises steps carried out with the material hot, in particular between the $T_g$ (glass transition temperature) and the $T_m$ (melting point) of this microcrystalline polyamide. Typically, the use of the object (subsequent life of the finished object) will be at a temperature below the $T_g$ of this microcrystalline polyamide.

Among polymer materials, amorphous polymers have the advantage of being transparent. Besides this intrinsic aesthetic advantage, they make it possible to protect and to bring out an underlying decoration. Among these amorphous polymers, mention may be made of PMMA, PC and amorphous PAs. The latter are of particularly high performance (EP 550 308 and EP 725 101). However, while they are being processed in the melt, they have the drawback of rapidly going into the solid state (owing to their high $T_g$, namely 100-200° C.) as they are being cooled and are therefore ill-suited for faithfully retranscribing the surface finish and feel of the mould and, more generally, of a complex texturizing surface. Since they are typically very rigid and barely malleable below their $T_g$, they are ill-suited to being formed in the solid state (for example by stamping). An amorphous polymer of low $T_g$ (<60° C.) is itself barely able to be envisaged, as it passes into the liquid state above its $T_g$, which of course makes it unsuitable for fulfilling its role of protecting the decorated object whenever the temperature rises somewhat. Another drawback of amorphous polymers, and even of amorphous PAs based on high-carbon monomers (e.g.: PA-BMACM.1/12), is the inferior chemical resistance (to stress cracking) and physical resistance (to UV radiation) compared with semicrystalline polymers, especially semicrystalline polyamides based on high-carbon monomers such as PA-11 or PA-12.

Among polymer materials, semicrystalline polymers therefore have the advantage of better chemical and physical resistance. Among these, semicrystalline polyamides constitute an advantageous choice. Among semicrystalline polyamides, preferred ones are those made from high-carbon monomers, such as PA-11 and PA-12, since their physico-chemical resistance is even better, and their water uptake and the consequences in terms of dimensional variations (and variations in other properties) are less than in the case of standard semicrystalline polyamides such as PA-6 and PA-6,6. However, these semicrystalline polyamides have the disadvantage of having a limited transparency and of passing rapidly into the solid state (owing to their fast and high recrystallization rate) while they cool, and are therefore ill-suited for faithfully retranscribing the surface finish and feel of the mould.

We have discovered that the use of a particular polymer, namely a "microcrystalline" polyamide, in other words a transparent but nevertheless semicrystalline polyamide with a particular degree of crystallinity, can provide a particularly advantageous solution for obtaining decorative and functional objects having aesthetic, attractive and high-quality visuo-tactile properties. The polyamides used in the invention are those from semicrystalline polyamides that are microcrystalline, that is to say those consisting of crystalline structures (spherulites) having a size small enough not to diffract light and thus allowing good transparency. In the rest of the text, these will be referred to as "microcrystallines". They may also be characterized by a transparency such that the light transmission at 560 nm on a polished object 1 mm in thickness is greater than 80%, advantageously greater than 88% (the object being obtained by standard processing methods, such as injection moulding and sheet extrusion/calendering).

This microcrystalline polyamide has many advantages. This is because such a material does not have the drawbacks of:

low transparency;

solidifying too rapidly;

passing into the liquid state above its $T_g$;

having a mediocre mechanical impact and scratch resistance;

having a mediocre chemical and stress-cracking resistance; and having a mediocre UV resistance.

In fact, such a material has the key advantage of being easily formed by solid-state (or partly solid-state) forming between its $T_g$ and its $T_m$, thanks to its malleability in this temperature range. The expression "solid-state (or partly solid-state) forming" is understood to mean various "warm" or "hot" thermomechanical treatments between $T_g$ and $T_m$, for the purpose of giving a finish possessing an aesthetic, attractive and high-quality and visuo-tactile character to the polymer material (and to the object of which this polymer material is one of the constituents). We mention by way of examples of such solid-state forming the following:

passage from a 2D (two-dimensional) form, for example a 600 μm sheet of the polymer material, to a 3D (three-dimensional) form has the result of a step using a thermoforming or stamping process between $T_g$ and $T_m$;

passage from one surface finish to another (smooth to rough), typically by a step and a process of bringing the material into contact with a textured surface (for example a rough metal or a fabric), by compression moulding or overmoulding, between $T_g$ and $T_m$, under pressure, for a certain time;

passage from a small-sized form (powder, small tile, sheet of small area) to a larger form (bulk object, tiled surface), typically by a sintering or welding process, between $T_g$ and $T_m$, under pressure, for a certain time;

complexing, lamination, or assembling, for example of a 600 μm sheet onto a substrate possessing anfractuosities (wood, fabric), for example during a step of a coating or lamination process;

complexing or transfer, for example onto a 600 μm sheet of the polymer material, of fibrils or powder (whether pigmented or not) for example during a step of a transfer process. This process consists, for example, in bringing into contact, at a temperature T between $T_g$ and $T_m$, under a pressure P, for a time t, a sheet of polymer material with a substrate containing the fibrils (e.g. a fabric), the said fibrils being transferred from the substrate to the polymer material in which they will become mechanically (and even also chemically) anchored, thereby giving the material a particularly soft and warm feel. Another example is that in which the polymer sheet is brought into contact with a bed of polymer powder (e.g. PA-11) under similar T, P, t conditions, all this giving us a material with a powder feel;

superior mechanical resistance to impacts, knocks and scratches, which resistance is most particularly manifested in terms of little visual impact of the attack (no fraying, bleaching, etc.) and not only in terms of weight loss or energy value;

hardness and non-malleability at $T_{ambient}$ and at $T<T_g$;

complete transparency, typically greater than or equal to that of a conventional amorphous polymer such as polycarbonate (PC), this being so for identical thicknesses of less than 2 mm;

chemical and stress-cracking resistance comparable to a semicrystalline PA (e.g. PA-11);

excellent UV resistance; and possibility of being decorated by sublimation (in addition to more conventional techniques such as screen printing).

SUMMARY OF THE INVENTION

The present invention relates to the use of a microcrystalline polyamide for obtaining an object having all or part of its outer surface formed from this microcrystalline polyamide and having a particular surface finish, in which:

the manufacture of the object comprises steps carried out hot between the $T_g$ (glass transition temperature) and the $T_m$ (melting point) of this microcrystalline polyamide;

the transparency of the microcrystalline polyamide is such that the light transmission at 560 nm on a polished object 1 mm in thickness is greater than 80%, advantageously greater than 88%, the transparency being measured on the object obtained by standard processing methods, such as injection moulding and sheet extrusion/calendering.

Advantageously, the microcrystalline polyamide is such that its degree of crystallinity is greater than 10% and less than 30% (1st DSC heating according to ISO 11357 at 40° C./min) and the enthalpy of melting is greater than 25 J/g and less than 75 J/g (1st DSC heating according to ISO 11357 at 40° C./min).

Preferably, it is such that its $T_g$ (glass transition temperature) is between 40° C. and 90° C. and its $T_m$ (melting point) is between 150° C. and 200° C.

Advantageously, it results from the chain-linking of monomers such that 50% or more, by weight, of these monomers are $\geq$C9 monomers (i.e. having a number of carbon atoms equal to 9 or higher).

The term "microcrystalline polyamide" is also understood to mean copolyamides and compositions based predominantly on the latter, or in which the microcrystalline polyamide is the matrix constituent. These compositions may be alloys, blends or composites, for example compositions that include plasticizers, stabilizers, pigments or dyes, mineral fillers and other miscible polymers that are compatible or have been made compatible by a third component.

The invention also relates to the objects manufactured from this microcrystalline polyamide and to the objects having, completely or partly their outer surface made from this microcrystalline polyamide exhibiting a particular surface finish.

Figure 1:
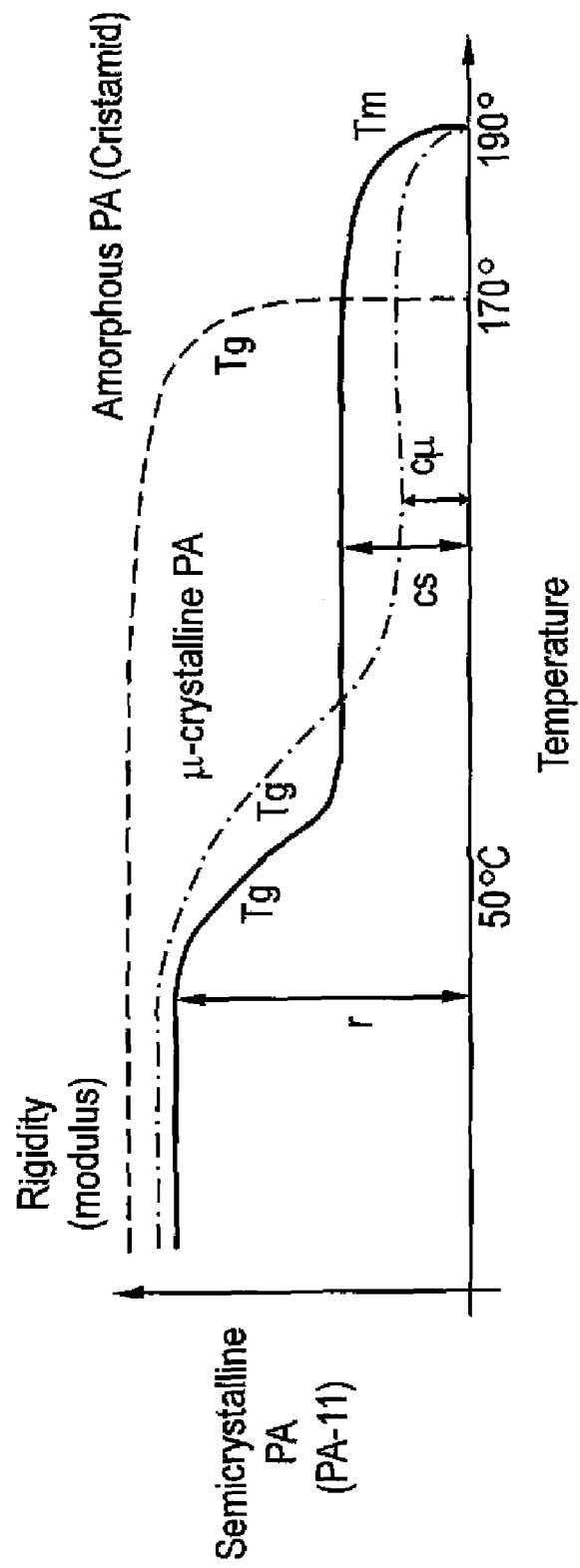
FIG. 1 shows schematically a representation of a DMA (dynamic mechanical analysis) plot in order to bring out the essential differences between, on the one hand, the microcrystalline polyamide of the invention and, on the other hand, conventional amorphous polymers and semicrystalline polymers.

In this FIG. 1:

PA-11 denotes the Atofina PA-11 called Rilsan BESN0 TL;

amorphous PA denotes PA-BMACM.T/BMACM.I/2 obtained by the condensation of BMACM, the T (terephthalic) acid, the I (isophthalic) acid and the 12 lactam, sold by Atofina under the name Cristamid® MS 1700;

μ-crystalline PA denotes a microcrystalline polyamide of composition, by weight:
- 65 parts of nylon-11 (PA-11) with an $\overline{M}_w$ of 45 000 to 55 000;
- 25 parts of IPDA.10/12 produced from the condensation of isophoronediamine, the C10 (sebacic) acid and lauryllactam; and
- 10 parts of a block copolymer comprising PA-12 blocks of 5000 $\overline{M}_n$ and PTMG blocks of 650 $\overline{M}_n$, the copolymer having an MFI of 4 to 10 g/10 min (at 235° C./1 kg). This composition is denoted in the rest of the text by PA-11 No. 6.

Plotted on this DMA graph on the x-axis is the temperature variable and on the y-axis the rigidity (modulus) variable. We can therefore see the modulus of the material over three broad temperature ranges, namely below $T_g$, between $T_g$ and $T_m$, and above $T_m$. Of course, we are not interested in the region above $T_m$, since all the materials are liquid and therefore cannot undergo solid-state forming. Of course, below $T_g$ we are interested only in materials that are sufficiently rigid for forming the structure of an object or for at least protecting the object from mechanical stresses. We are therefore most particularly interested in the region between $T_g$ and $T_m$, the region where typically we envisage manufacturing the object or at least carrying out some of the manufacturing steps, especially a finishing step, so as to give it the visuo-tactile properties that are desired.

In FIG. 1 we see that below $T_g$ the three polymers are indeed sufficiently rigid (in order to protect the object during its use, and not provide formability during manufacture of the object). Above its $T_g$, the amorphous PA becomes liquid: therefore it cannot be worked and formed in the solid state above its $T_g$ and could not preserve intact its visual decoration (while below its $T_g$ it is obviously much too rigid and practically unmalleable to be worked and formed). The semicrystalline PA sees its modulus drop below $T_g$, and it remains in the solid state up to its $T_m$. However, it is still too rigid to be easily worked and formed in the solid state. The μ-crystalline PA is, between $T_g$ and $T_m$, sufficiently flexible and malleable to be easily worked and formed in the solid state. However, between $T_g$ and $T_m$ the μ-crystalline PA is still sufficiently crystalline and rigid not to flow or liquefy. The overall practical benefit of such a material is therefore understood. In the case of the semicrystalline PA, the ratio "cs/r" also represents, approximately, the degree of crystallinity, which is too high. In the case of the μ-crystalline PA, the ratio "cμ/r" also represents, approximately, the degree of crystallinity, which is just enough to be sufficiently solid and rigid, while still being sufficiently flexible and malleable in order to be easily formed. If one were to imagine a still less crystalline material (having an even lower degree of crystallinity or enthalpy of melting), and therefore even less rigid between $T_g$ and $T_m$, this would then be faced with creep and flow problems, the product would no longer be mechanically durable and, from a practical standpoint, the behaviour would be very close to that of an amorphous PA of the same $T_g$.

In order to adjust the degree of crystallinity and therefore the modulus between $T_g$ and $T_m$, a person skilled in the art can vary the respective proportions of the various monomers or constituents. To increase the hot modulus of the polymer material, the proportion of disorganizing species, that is to say species that obstruct the regular organization of the predominant macromolecules and therefore impede their crystallization, may be reduced. If on the contrary it is desired to further reduce the modulus, this proportion would be increased.

Depending on the intended final application, a fine adjustment may therefore be made with regard to the level of malleability between $T_g$ and $T_m$, recognizing the fact that a less crystalline material will also be less chemically resistant.

What $T_g$ and what $T_m$ should be chosen? The choice of $T_g$ to $T_m$ range corresponds as it were to the temperature at which the key steps of manufacturing the finished article will be carried out. In many industrial processes, this temperature must remain reasonable, that is to say must not remain too high so that the other constituents of the object do not undergo degradation (for example the liquefaction of an ABS third polymer constituent, which liquefies at around 100° C.). It is therefore preferable to choose a $T_g$ below 90° C. (but well above room temperature or above the service temperature of the object). A microcrystalline PA with a $T_g$ of 140° C. for example would mean a manufacturing process (for manufacturing the final object) above 140° C., which may therefore be restrictive.

DETAILED DESCRIPTION OF THE INVENTION

By way of examples of microcrystalline polyamides, mention may be made of the transparent composition comprising, by weight, the total being 100%:
- 5 to 40% of an amorphous polyamide (B) that results essentially from the condensation:
  - either of at least one diamine chosen from cycloaliphatic diamines and aliphatic diamines and of at least one diacid, chosen from cycloaliphatic diacids and aliphatic diacids, at least one of these diamines or diacid units being cycloaliphatic,
  - or of a cycloaliphatic α,Ω-aminocarboxylic acid,
  - or of a combination of these two possibilities, and
  - optionally of at least one monomer chosen from α,Ω-aminocarboxylic acids or the possible corresponding lactams, aliphatic diacids and aliphatic diamines;
- 0 to 40% of a flexible polyamide (C) chosen from copolymers having polyamide blocks and polyether blocks, and copolyamides;
- 0 to 20% of a compatibilizer (D) for (A) and (B);
- 0 to 40% of flexible modifier (M);
- with the condition that (C)+(D)+(M) is between 0 and 50%;
- the balance to 100% of a semicrystalline polyamide (A).

This composition is microcrystalline. Without being tied by this explanation, the inventors believe that this is due to the very low size of the crystalline structures, the size being small enough not to diffract light as in the case of conventional semicrystalline polymers (PA-6, PA-12, PP, PE, PBT, etc.). However, this composition is semicrystalline since, as observed by DSC ("differential scanning calorimetry") analysis, the enthalpy of melting has a substantial value of a similar order of magnitude as a nylon-11 (PA-11).

With regard to the semicrystalline polyamide (A), mention may be made of (i) aliphatic polyamides, which are products resulting from the condensation of a $\geq$C9 aliphatic α,Ω-aminocarboxylic acid, of a $\geq$C9 lactam or the products resulting from the condensation of an aliphatic diamine and of an aliphatic diacid, at least one of the diamine and of the diacid being $\geq$C9.

By way of examples of aliphatic α,Ω-aminocarboxylic acids, mention may be made of 11-amino undecanoic and 12-aminododecanoic acids. As examples of lactams, mention may be made of lauryllactam. As examples of aliphatic diamines, mention may be made of hexamethylenediamine, dodecamethylenediamine and trimethylhexamethylenediamine. As examples of aliphatic diacids, mention may be made of adipic, azelaic, suberic, sebacic and dodecanedicarboxylic acids.

Among aliphatic polyamides, mention may be made by way of example and non-limitingly, of the following polyamides: polyundecanamide (PA-11); polylauryllactam (PA-12); polyhexamethyleneazelamide (PA-6,9); polyhexamethylenesebacamide (PA-6,10); polyhexamethylenedodecanamide (PA-6,12); polydecamethylenedodecanamide (PA-10,12); polydecamethylenesebacanamide (PA-10,10) and polydodecamethylenedodecanamide (PA-12,12).

Advantageously (A) is PA-11 and PA-12. It would not be outside the scope of the invention if (A) were to be a blend of aliphatic polyamides.

With regard to the amorphous polyamide with a cycloaliphatic unit (B), the diamines are, for example, cycloaliphatic diamines containing two cycloaliphatic rings.

These diamines satisfy the general formula (I)

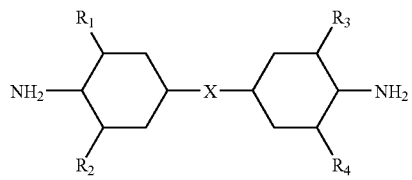

in which R1 to R4 represent identical or different groups chosen from a hydrogen atom or alkyl groups having from 1 to 6 carbon atoms, and X represents either a single bond or a divalent group consisting of:
- a linear or branched aliphatic chain having from 1 to 10 carbon atoms;
- a cycloaliphatic group having from 6 to 12 carbon atoms;
- a linear or branched aliphatic chain having from 1 to 10 carbon atoms, the said chain being substituted with cycloaliphatic groups having from 6 to 8 carbon atoms;
- a group having 8 to 12 carbon atoms, consisting of a linear or branched dialkyl, with a cyclohexyl or benzyl group.
- the cycloaliphatic diamines may be isomers of bis(4-aminocyclohexyl)methane (BACM), bis(3-methyl-4-aminocyclohexyl)methane (BMACM), 2,2-bis(3-methyl-4-aminocyclohexyl)propane (BMACP), and para-aminodicyclohexylmethane (PACM). The other diamines commonly used may be isophoronediamine (IPDA) and 2,6-bis(aminomethyl)norbornane (BAMN). The aliphatic diacids were mentioned above. As an example, mention may be made of PA-IPDA,12 that results from the condensation of isophoronediamines with dodecanedicarboxylic acid. The amorphous polyamide (B) may optionally contain at least one monomer or comonomer chosen from:
- α,Ω,-aminocarboxylic acids;
- aliphatic diacids;
- aliphatic diamines;

these products were described above. As examples of (B), mention may be made of PA-IPDA,10, coPA-IPDA,10/12, and PA-IPDA,12. It would not be outside the scope of the invention if (B) were to be a blend of several amorphous polyamides.

With regard to the flexible polyamide (C) and firstly the copolymers having polyamide blocks and polyether blocks, these result from the copolycondensation of polyamide blocks having reactive ends with polyether blocks having reactive ends, such as, inter alia:
1) polyamide blocks having diamine chain ends with polyoxyalkylene blocks having dicarboxylic chain ends;
2) polyamide blocks having dicarboxylic chain ends with polyoxyalkylene blocks having diamine chain ends, obtained by cyanoethylation and hydrogenation of aliphatic dihydroxylated α,Ω-polyoxyalkylene blocks called polyetherdiols;
3) polyamide blocks having dicarboxylic chain ends with polyetherdiols, the products obtained being, in this particular case, polyetheresteramides. Advantageously, copolymers (C) are of this type.

Polyamide blocks having dicarboxylic chain ends derive, for example, from the condensation of α,Ω-aminocarboxylic acids, of lactams or of dicarboxylic acids and diamines in the presence of a chain-stopping dicarboxylic acid.

The number-average molar mass $\overline{M}_n$ of the polyamide blocks is between 300 and 15000 and preferably between 600 and 5000. The mass $\overline{M}_n$ of the polyether blocks is between 100 and 6000 and preferably between 200 and 3000.

Polymers having polyamide blocks and polyether blocks may also include randomly distributed units. These polymers may be prepared by the simultaneous reaction of the polyether and polyamide-block precursors.

For example, it is possible to react a polyetherdiol, a lactam (or an α,Ω-amino acid) and a chain-stopping diacid in the presence of a small amount of water. A polymer is obtained having essentially polyether blocks and polyamide blocks of very variable length, but also the various reactants, having reacted in a random fashion, which are distributed randomly along the polymer chain.

These polymers having polyamide blocks and polyether blocks, whether they derive from the copolycondensation of polyamide and polyether blocks prepared beforehand or from a one-step reaction, have, for example, Shore D hardnesses which may be between 20 and 75 and advantageously between 30 and 70 and an intrinsic viscosity of between 0.8 and 2.5 measured in meta-cresol at 25° C. for an initial concentration of 0.8 g/100 ml. The MFIs may be between 5 and 50 (235° C., with a load of 1 kg).

The polyetherdiol blocks are either used as such and copolycondensed with polyamide blocks having carboxylic ends or they are aminated in order to be converted into polyetherdiamines and condensed with polyamide blocks having carboxylic ends. They may also be mixed with polyamide precursors and a chain stopper in order to make polyamide-block polyether-block polymers having randomly distributed units. Usually, these copolymers having polyamide blocks and polyether blocks are those with PA-11, PA-12 or PA-6 polyamide blocks and PTMG (polytetramethylene glycol) or PPG (polypropylene glycol) polyether blocks.

With regard to the flexible polyamide (C) consisting of a copolyamide this results either from the condensation of at least one α,Ω aminocarboxylic acid (or a lactam), at least one diamine and at least one dicarboxylic acid, or from the condensation of at least two α,Ω-aminocarboxylic acids (or their possible corresponding lactams or of a lactam and of the other in the form of an α,Ω-aminocarboxylic acid). These constituents are already described above.

By way of examples of copolyamides, mention may be made of copolymers of caprolactam and lauryllactam (PA-6/12), copolymers of caprolactam, adipic acid and hexamethylenediamine (PA-6/6,6), copolymers of caprolactam, lauryllactam, adipic acid and hexamethylenediamine (PA-6/12/6, 6), copolymers of caprolactam, lauryllactam, 11-aminoundecanoic acid, azelaic acid and hexamethylenediamine (PA-6/6,9/11/12), copolymers of caprolactam, lauryllactam, 11-amino-undecanoic acid, adipic acid and hexamethylenediamine (PA-6/6,6/11/12), and copolymers of lauryllactam, azelaic acid and hexamethylenediamine (PA-6,9/12). The preferred copolyamides are copolyamides with a pronounced copolymer character, that is to say with essentially equivalent proportions of the various comonomers, which results in properties furthest away from the corresponding polyamide homopolymers. It would not be outside the scope of the invention if (C) were to be a blend of several copolymers having polyamide blocks and polyether blocks, or a blend of several copolyamides or any combination of these options.

With regard to the compatibiliser (D) for (A) and (B), this is any product that lowers the temperature needed to make the blend of (A) and (B) transparent. Advantageously, this is a polyamide. For example, if (A) is PA-12, then (D) is PA-11. Preferably, this is a catalysed aliphatic polyamide.

With regard to the catalysed polyamide (D), this is a polyamide as described above in the case of (A), but containing a polycondensation catalyst such as a mineral or organic acid, for example phosphoric acid. The catalyst may be added to the polyamide (D) after it has been prepared by any method, or, quite simply, and preferably, this may be the rest of the catalyst used for its preparation. The term "catalysed polyamide" means that the chemistry will be continued beyond the steps of synthesizing the base resin and therefore during the subsequent steps in the preparation of the compositions of the invention. Very substantial polymerization and/or depolymerization reactions may take place during the blending of the polyamides (A) and (B) and (D) in order to prepare the compositions of the present invention. Typically, the Applicant believes (without being tied down to this explanation), that polymerization (chain extension) and chain branching (for example, bridging via phosphoric acid) continue to take place. In addition, this may be considered as a tendency toward re-equilibration of the polymerization equilibrium, and therefore a kind of homogenization. However, it is recommended that the polyamides be thoroughly dried (and advantageously the moisture content properly controlled) in order to prevent any depolymerization. The amount of catalyst may be between 5 ppm and 15000 ppm of phosphoric acid with respect to the resin (D). For other catalysts, for example boric acid, the contents will be different and may be chosen appropriately, according to the usual techniques for the polycondensation of polyamides.

With regard to the flexible modifier (M), mention may be made, by way of example, of functionalized polyolefins, grafted aliphatic polyesters, copolymers having polyether blocks and polyamide blocks, these optionally being grafted, copolymers of ethylene with an alkyl (meth)acrylate and/or with a vinyl ester of a saturated carboxylic acid. The copolymers having polyether blocks and polyamide blocks may be chosen from those mentioned above in the case of (C) preferably flexible copolymers being chosen, that is to say those having a flexural modulus of less than 200 MPa.

The modifier may also be a polyolefin chain with polyamide or polyamide oligomer grafted species; thus, it has affinity with polyolefins and with polyamides.

The flexible modifier may also be a block copolymer having at least one block compatible with (A) and at least one block compatible with (B).

As examples of flexible modifiers, mention may also be made of:

copolymers of ethylene with an unsaturated epoxide and optionally with an ester or an unsaturated carboxylic acid salt or with a vinyl ester of a saturated carboxylic acid. These are, for example, ethylene/vinyl acetate/glycidyl(meth)acrylate copolymers or ethylene/alkyl (meth)acrylate/glycidyl-(meth)acrylate copolymers;

copolymers of ethylene with an unsaturated carboxylic acid anhydride and/or with an unsaturated carboxylic acid that can be partly neutralized by a metal (Zn) or an alkaline metal (Li) and optionally with an ester of an unsaturated carboxylic acid or with a vinyl ester of a saturated carboxylic acid. These are, for example, ethylene/vinyl acetate/maleic anhydride copolymers or ethylene/alkyl(meth)acrylate/maleic anhydride copolymers or else ethylene/Zn or Li(meth)acrylate/maleic anhydride copolymers; and polyethylene, polypropylene, ethylene-propylene copolymers, these being grafted or copolymerized with an unsaturated carboxylic acid anhydride and then condensed with a monoaminated polyamide (or a polyamide oligomer). These products are described in EP 342 066.

Advantageously, the functionalized polyolefin is chosen from ethylene/alkyl(meth)acrylate/maleic anhydride copolymers, ethylene/vinyl acetate/maleic anhydride copolymers and ethylene-propylene copolymers, in which propylene is predominant, these copolymers being grafted by maleic anhydride and then condensed with a monoaminated polyamide 6 or monoaminated oligomers of caprolactam.

Preferably, this is an ethylene/alkyl(meth)acrylate/maleic anhydride copolymer comprising up to 40 wt % of alkyl (meth)acrylate and up to 10 wt % of maleic anhydride. The alkyl(meth)acrylate may be chosen from methyl acrylate, ethyl acrylate, n-butyl acrylate, isobutyl acrylate, 2-ethylhexyl acrylate, cyclohexyl acrylate, methyl methacrylate and ethyl methacrylate.

As examples of grafted aliphatic polyesters, mention may be made of polycaprolactone grafted with maleic anhydride, glycidyl methacrylate, vinyl esters or styrene. These products are described in Application EP 711 791.

It is recommended to choose a flexible modifier that does not reduce the transparency of the compositions. The advantage of the compositions (A)+(B), (A)+(B)+(C) and (A)+(B)+(C)+(D) mentioned above is that they have a resulting refractive index close to most of the modifiers (M) mentioned. It is therefore possible to add a modifier (M) with the same (or very similar) refractive index. This was not the case with the transparent polyamide compositions cited in the prior art, since their refractive indices are typically higher than the refractive index of the most usual modifiers (M).

In general, the modifier (M) is useful for further softening, or for conferring a particular property (hence being called a modifier) without thereby losing the advantageous properties of transparency, low-temperature manufacture and sublimation capability. Among these additional properties that the modifier may provide, we mention the following: an impact modifier for improving the impact resistance; a modifier carrying reactive functional groups in order to improve the adhesion of the material to substrates; a modifier for giving a matt appearance; a modifier for giving a silky or slippery feel; a modifier for making the material more viscous, so as to process it by blow moulding.

It is advantageous to blend the modifiers so as to combine their effects.

Advantageous compositions are those whose proportions of the constituents are the following (the total being 100%) and are described in Table 1 below:

TABLE 1

| A | B | C + D + M | C | D | M |
|---|---|---|---|---|---|
| balance to 100% | 5 to 40 | 0 to 50 | 0 to 40 | 0 to 20 | 0 to 40 |
| balance to 100% | 20 to 30 | 0 to 50 | 0 to 40 | 0 to 20 | 0 to 40 |
| balance to 100% | 5 to 40 | 0 to 30 | 0 to 30 | 0 to 20 | 0 to 30 |
| Balance to 100% | 10 to 30 | 0 to 30 | 0 to 30 | 0 to 20 | 0 to 30 |
| balance to 100% | 20 to 30 | 0 to 30 | 0 to 30 | 0 to 20 | 0 to 30 |
| balance to 100% | 10 to 30 | 0 to 20 | 0 to 20 | 0 to 20 | 0 to 20 |
| balance to 100% | 10 to 30 | 5 to 15 | 0 to 15 | 0 to 15 | 0 to 15 |
| balance to 100% | 20 to 30 | 0 to 20 | 0 to 20 | 0 to 20 | 0 to 20 |
| balance to 100% | 20 to 30 | 5 to 15 | 0 to 15 | 0 to 15 | 0 to 15 |

These compositions are manufactured by melt-blending the various constituents (in a twin-screw, BUSS® or single-screw extruder) using standard techniques for thermoplastics. The compositions may be granulated, for subsequent use (it is sufficient to remelt them) or else then injection-moulded in a mould or an extrusion or coextrusion device for manufacturing sheet or film. A person skilled in the art can readily adjust the compounding temperature in order to obtain a transparent material; as a general rule, it is sufficient to increase the compounding temperature, for example to about 280 or 290° C.

These compositions may include thermal stabilizers, antioxidants and UV stabilizers.

By way of example of microcrystalline polyamides, mention may be made of the transparent composition comprising, by weight, the total being 100%:

5 to 40% of an amorphous polyamide (B) that results essentially from the condensation of at least one optionally cycloaliphatic diamine, of at least one aromatic diacid and optionally of at least one monomer chosen from:
  α,Ω-aminocarboxylic acids,
  aliphatic diacids,
  aliphatic diamines;
0 to 40% of a flexible polymer (C) chosen from copolymers having polyamide blocks and polyether blocks, and copolyamides;
0 to 20% of a compatibilizer (D) for (A) and (B),
(C)+(D) is between 2 and 50%;
with the condition that (B)+(C)+(D) is not less than 30%,
the balance to 100% of a semicrystalline polyamide (A).

It differs from the previous one essentially by the nature (B) and to a lesser extent by the proportions of the constituents. It is prepared in the same way and is microcrystalline.

Advantageously, the proportion of (B) is between 10 and 40%, and preferably between 20 and 40%. Advantageously, the proportion of (C)+(D) is between 5 and 40%, and preferably 10 and 40%.

With regard to the amorphous polyamide (B) in this other microcrystalline polyamide composition, this essentially results from the condensation of at least one optionally cycloaliphatic diamine and of at least one aromatic diacid. Examples of aliphatic diamines were mentioned above; the cycloaliphatic diamines may be isomers of bis(4-aminocyclohexyl)methane (BACM), bis(3-methyl-4-aminocyclohexyl)methane (BMACM), and 2,2-bis(3-methyl-4-aminocyclohexyl)propane (BMACP). Other commonly used diamines may be isophoronediamine (IPDA) and 2,6-bis(aminomethyl)norbornane (BAMN). As examples of aromatic diacids, mention may be made of terephthalic (T) and isophthalic (I) acids.

The amorphous polyamide (B) may optionally contain at least one monomer chosen from:
  α,Ω-aminocarboxylic acids,
  aliphatic diacids,
  aliphatic diamines,
these products were described above.

As examples of (B), mention may be made of the amorphous semi-aromatic polyamide PA-12/BMACM, TA/BMACM,IA synthesized by melt polycondensation using bis(3-methyl-4-aminocyclohexyl)methane (BMACM), lauryl-lactam (L12) and isophthalic acid and terephthalic acid (IA and TA). It would not be outside the scope of the invention if (B) were to be a blend of several amorphous polyamides.

Various Embodiments Will Now be Described

A process in which the microcrystalline polyamide is particularly advantageous is overmoulding with in-mould decoration (IMD). This microcrystalline polyamide material is particularly suitable for its use in the IMD process. This process consists in placing, in the bottom of the mould, a sheet or film that has been decorated beforehand (and, optionally, has been thermoformed beforehand) and in then in overmoulding (it would be more appropriate to employ the term "undermoulding", but usually the term "overmoulding" is employed) a polymer in order to give substance to the object, the sheet or film then becoming the decorated surface of the object. The microcrystalline polyamide is particularly suitable as it allows not only visual "in-mould" decoration but also tactile decoration by its ability to take on the texture of the surface of the mould. The microcrystalline polyamide, which is semicrystalline but not excessively crystalline, is in fact particularly suitable for sublimation decoration between its $T_g$ and its $T_m$ (and preferably close to its $T_m$): the sublimation pigments easily penetrate into the material owing to the high mobility of its amorphous phase (and to the high proportion of the latter) without thereby the material liquefying in its entirety and therefore without the object deforming unacceptably. Among the other advantages of our microcrystalline polyamide, we stress its better thermoformability (thermoforming often being employed before overmoulding), its much better chemical resistance than amorphous polymers (for example, polycarbonate ABS) and its excellent resistance to mechanical attack and to UV radiation (much better than that of polycarbonate). It goes without saying that the process for decorated and overmoulded film is merely one example and that our microcrystalline polyamide is advantageous for other manufacturing processes, such as compression moulding, injection moulding, thermoforming and any process in which the ductility and malleability of the material is an asset, it being understood that the said process is carried out at least partly at a temperature between $T_g$ and $T_m$ (and it being understood that subsequently the service temperature of the object will be below this $T_g$, or that this $T_g$ is substantially above room temperature).

"Solid-state paint": advantage of the microcrystalline polyamide and of the IMD process as regards paint.

Up until now we have described the advantages of our material and its applications compared with amorphous or conventional semicrystalline polymers. We will now compare it with objects that are decorated and protected, not by polymers but by paint. Paint or screen-printing ink has the advantage of being able to give not only aesthetic visual effects but also attractive tactile effects. However, paint has the drawback of requiring an often lengthy application process, and the presence of solvents, which from the ecological standpoint is undesirable. In terms of mechanical and chemical protection, paints, for example those based on polyurethane, are not as effective as a coating made of a microcrystalline polyamide. Between its $T_g$ and its $T_m$, the microcrystalline polyamide is particularly flexible and malleable, while still remaining in the solid state. Its solid state allows it to preserve the integrity of its visual decoration (for example a sublimed decoration—paint is obviously liquid during its application) and its malleability allows it to be easily applied to the substrate and to acquire an attractive surface finish and feel. Once applied, somewhat in the manner of paint, the microcrystalline PA hardens and the decorated object is then effectively protected (the temperature is then below $T_g$).

Grained visuo-tactile structure. A smooth shiny sheet of microcrystalline PA is placed against a metal surface provided with a grained relief, the whole assembly being at 110° C., i.e. between $T_g$ and $T_m$, under 20 bar for 3 minutes. The PA-11 No. 6 composition (which has a $T_g$ of about 55° C. and a $T_m$ of about 188° C.) may be used for example. The sheet of microcrystalline PA has the advantage of acquiring a surface relief, a visual appearance and a feel that are very faithfully reproduced. It is therefore possible, starting with the same object made of this microcrystalline PA, to give it subsequently a desired visuo-tactile effect, without any choice restriction and consistent with the requirements of its final function (for example, to delustre glazing, to give a bottle a soft feel, etc.). Another advantage is that this texturing based on a visuo-tactile effect may be given during the final step in the manufacture of the object, in a "finishing" operation, and only on part of the surface of the object. What is more, the texture or decoration of the said object will be highly resistant thereafter (for example, resistant to scratching), during use of the object (at $T<T_g$), the material hardening under the effect of time and an annealing operation.

With a conventional semicrystalline PA (e.g. PA-11), the reproduction of the relief is much less pronounced (the product being insufficiently deformable between its $T_g$ and its $T_m$); the mechanical resistance (for example scratch resistance) of the surface is also lower. With an amorphous PA (e.g. PA-BMACM.12), if $T>T_g$, the PA object melts, which is undesirable; if $T<T_g$, the PA is marked very little (the product is too undeformable and too rigid).

It is possible to use another process, that of overmoulding. A smooth bilayer sheet consisting of microcrystalline polyamide material/maleic anhydride-grafted polypropylene, is placed in the bottom of a grained mould at 60° C., with the PA face on the grained mould side. This mould is a mould of an injection moulding machine. An overmoulding operation is then carried out by injecting molten PP at 210-230° C. with a hold pressure of 500 bar. After removal from the mould, the surface on the sheet side has perfectly acquired the grained relief of the mould. As an example of this bilayer material, it is possible to use PA-11 No. 6/Orevac® 18729.

Corrected/polished visuo-tactile structure. A smooth and shiny sheet of microcrystalline PA is now placed against a metal surface provided with a polish and with a high gloss, the whole assembly again being under the same conditions (at 110° C., 20 bar for 3 to 5 minutes). Once the microcrystalline PA sheet has cooled, it has a polish and a gloss better than the original, the several surface imperfections (small bumps and/or reliefs) being erased and smoothed out. The surface appearance of the product is therefore as it were easily "correctable", this is not the case with conventional semicrystalline PAs (e.g. a PA-11) or amorphous PAs (e.g. PA-BMACM.12). One advantage is therefore that it is possible, for example, to produce a sheet of microcrystalline polyamide without any particular precaution as regards the surface appearance. It may therefore be manufactured at high speed and high productivity (extrusion, casting or blown-film processes). The surface appearance will in any case be "corrected" by one (or more) subsequent finishing operations, as described at the start of this paragraph.

It is possible to use another process, that of overmoulding. A smooth bilayer sheet consisting of microcrystalline polyamide material/maleic anhydride-grafted polypropylene, is placed in the bottom of a polished mould at 60° C., with the PA face on the polished mould side. This mould is a mould of an injection moulding machine. An overmoulding operation is then carried out by injecting molten PP at 210-230° C. with a hold pressure of 500 bar. After removal from the mould, the surface on the sheet side has perfectly acquired the polish of the mould. As an example of this bilayer material, it is possible to use PA-11 No. 6/Orevac® 18729.

Double-sided visuo-tactile structure, with wood appearance & bonding on the lower face and wood feel on the upper face. A smooth, shiny sheet of microcrystalline PA is now placed against a wooden surface at a high enough temperature (but always within the $T_g$-$T_m$ range) in such a way that there is adhesion between the wood and the PA (the PA penetrating the anfractuosities of the wood surface, thus creating mechanical anchoring). At the same time (or afterwards), a wood decoration (made of wood or reproduced on a metal surface) is placed on the other face at a temperature T that is low enough (but still within the $T_g$-$T_m$ range) for there to be no adhesion but nevertheless there is transfer of the surface texture. This therefore has the advantage that the wood is protected by a PA surface (providing chemical, mechanical and UV resistance) and the advantage that this PA surface has the texture and feel of wood. As an example, the operation may be carried out as follows: the wood is bonded to one side of the sheet at 110° C. under 20 bar for 5 minutes and a metal plate with a "wood" graining is placed on the other side of the sheet, at the same time (at 110° C., under 20 bar and for 5 minutes), the graining being transferred into the sheet.

Fabric visuo-tactile structure. A smooth shiny sheet of microcrystalline PA is now placed against a non-woven textile surface (for example at 110° C., under 20 bar for 5 minutes). As described above, the surface finish of the non-woven will be faithfully retranscribed but also, if T is high enough, but still within the $T_g$-$T_m$ range, textile fibrils will remain trapped in the sheet of microcrystalline PA, thereby giving a particularly pronounced soft feel, of the fabric type.

The fabric may be replaced with a bed of powder or a substrate impregnated with powder, for example PA-11 powder. The hot contacting operation is carried out between $T_g$ and $T_m$, under a pressure P for a time t, and a material with a "powder" feel is obtained. In addition to the feel effect, the powder and fibrils may be coloured or pigmented, which will give an additional visual effect. It is also possible to replace the fabric with a bed of glass beads, therefore obtaining a different feel and even better scratch resistance.

Fabric visuo-tactile structure without impregnation. We now consider the case in which the texturizing surface is no longer a "non-woven" as above, but a much less tearable fabric, or a textured paper, or a subtly embossed leather surface, or another soft, finely porous texturizing surface. In this case, we obtain very good and faithful retranscription of this subtle surface finish, without at all the particles of the texturizing surface remaining trapped in our polymer material. Our material is sufficiently malleable and flexible for the surface relief of the texturizing surface to be well "transferred", but it is however sufficiently solid and rigid not to bond excessively to the latter. So as to obtain the desired effect and to control the desired degree of adhesion to the texturizing surface or the substrate, the following parameters may be varied: composition of the microcrystalline polyamide, which allows the degree of crystallinity to be varied (the lower the crystallinity, the higher the adhesion); the thickness of the microcrystalline polyamide sheet (the thinner the sheet, the greater the adhesion); the processing temperature (the higher the temperature the greater the adhesion); the processing time (the longer the time, the greater the adhesion); the processing pressure (the higher the pressure, the greater the adhesion).

We now no longer compare our material with a liquid of the paint type, but with a liquid of the polymer melt type. If the polymer melt is brought into contact with a woven or nonwoven or paper surface (any type of readily porous surface), for the same objective of finally giving the plastic an appearance and feel similar to that of this texturizing surface, there will be the problem that the polymer melt adheres too strongly. It will then be impossible to remove the fabric texturizing surface without damage. The latter will tear and/or will remain partly stuck to the plastic. In either case, we will not obtain the desired feel.

Adhesion/weldability. A smooth shiny sheet of microcrystalline PA is now placed so as to be partly superposed on another sheet of microcrystalline PA. The combination is pressed at a temperature T between $T_g$ and $T_m$ (for example 180° C., under 30 bar for 3 minutes). The material has the double advantage of being weldable and of the fact that this weld has almost the same thickness as the sheet (thanks to the flexibility and hot workability of this microcrystalline material).

Adhesion/sintering. Better sinterability of a microcrystalline polyamide powder. Sintering is an operation that consists in consolidating powder by heating it below its $T_m$. Ceramics are typically manufactured by sintering. This sinterability is to be combined with the weldability described in the previous paragraph. More generally, the microcrystalline polyamide of the invention possesses better interdiffusability between $T_g$ and $T_m$, that is to say two objects (for example, powder grains and sheets) brought into contact with each other between $T_g$ and $T_m$ will be better able to be bonded together. Since the material of comparison is at a temperature between $T_g$ and $T_m$, it is by default a semicrystalline material (an amorphous material, not having a $T_m$, would be in the liquid state above its $T_g$).

Malleability/any hot forming between $T_g$ and $T_m$. In general, malleability is better between $T_g$ and $T_m$, i.e. better formability between $T_g$ and $T_m$. For example, if a flat sheet of the microcrystalline polyamide of the invention is placed, between $T_g$ and $T_m$, in a mould having a bowl shape, less force will have to be used to force the material to adopt this bowl shape. Compared with the ability to take a grain (see the previous paragraphs) forming is not so different—at the end of the day this may be seen as a simple change of scale between the grained surface, which is a relief on a small scale (hollows and bumps around one hundred microns in size), and the bowl, which is a relief on a large scale (tens of cm). Let us consider the example of a decoration sheet for IMD (In-mould Decorating). Two opposing advantages are desired. The first is that it is necessary to have a material that is malleable when hot (between $T_g$ and $T_m$) so that it can undergo deep thermoforming (pronounced 3rd dimension or high relief). The second is that, after the object has been manufactured by IMD, it is necessary to have a surface that is sufficiently hard and tough to withstand mechanical attack such as scratching, notching, impact, etc. In the prior art, it is necessary to have a range of sheets or films, some being more thermoformable but less resistant to mechanical attack (or requiring an additional crosslinking operation or the addition of a protective varnish), the others having a surface that is harder and more resistant but only able to be thermoformed less deeply (in low relief). In contrast, the microcrystalline polyamide of the invention makes it possible to have both advantages at the same time. This is because it is particularly thermoformable, being particularly soft/malleable in the temperature region between its $T_g$ and its $T_m$, during its manufacture, while still being thereafter, during its use at $T<T_g$, sufficiently hard, rigid and tough to provide very good resistance to mechanical attack of the scratching, cutting and impact type. This double advantage is provided by the microcrystalline character and the low degree of crystallinity of the semicrystalline product, which provides a particularly large difference in rigidity (as measured by the flexural, tensile and/or shear modulus) between the temperature region below $T_g$ and the region between $T_g$ and $T_m$.

Injection moulding in the pseudo-liquid state below $T_m$. The microcrystalline polyamide of the invention is advantageous for reproducing surface finishes in processing operations carried out in the liquid state, such as injection moulding. At first sight, it would seem that injection moulding is a process carried out in the liquid state, and therefore above $T_m$ and not between $T_g$ and $T_m$. However, in the operation of injection moulding, over part of the time during which it is being carried out, the skin of the object is in the solid state and the core in the liquid state, the latter exerting a pressure on the skin against the surface of the mould. A not inconsiderable portion of the thickness is therefore in the solid state, in fact between $T_g$ and $T_m$, and subjected to a pressure coming from the core of the part. Under these circumstances, the microcrystalline polyamide of the invention will also be better able to reproduce the surface texture of the mould than more conventional materials, such as amorphous thermoplastic polymer materials or "standard" non-transparent semicrystalline polymer materials.

Thus, PA-11 No. 6 ($T_g \sim 55°$ C. and $T_m \sim 188°$ C.), which therefore is liquid above about 188° C., reproduces the grained surface of the mould more faithfully than the materials below:
- the semicrystalline PA-11 Rilsan BESN0 TL ($T_g \sim 45°$ C. and $T_m \sim 188°$ C.), which therefore is liquid above about 188° C., reproduces the grained surface of the mould less faithfully than PA-11 No. 6;
- the amorphous PA termed PA-BMACM.T/BMACM.1/12 (Cristamid MS1700 from Atofina) with a $T_g$ of about 170° C., which is therefore liquid above about 170° C., poorly reproduces the grained surface of the mould, as it solidifies too quickly on contact with the cold wall (20° C.) of the mould. The situation is no better if the mould is heated to 100° C.

Adhesion to a substrate. Better ability to adhere to a substrate possessing anfractuosities (i.e. having a relief sufficiently pronounced for points of attachment to be able to be created with another material) will be described. For example, the microcrystalline polyamide of the invention can be pressed onto wood or fabric, below $T_m$, under pressure and for a certain time, and can generate good adhesion to this substrate. (A conventional semicrystalline material will not adhere, or less strongly, or will require longer time, higher temperature or higher pressure). In comparison with the "double-sided visuo-tactile structure with wood appearance & bonding on the lower face and a wood feel on the upper face" paragraph, and by analogy with the previous paragraph on injection moulding in the liquid state, the temperature is partly between $T_g$ and $T_m$. In other words, our material is in a lamination process in which it is deposited in the melt state onto the cold substrate, but it is already partly cooled between $T_g$ and $T_m$ on the cold substrate side, and therefore its malleability (between $T_g$ and $T_m$) advantageously acts in its favour in order to create the as-desired adhesion to the substrate.

Glass-fibre-filled microcrystalline polyamide-surface appearance, feel and colour. Another example of an advantageous use of the microcrystalline polyamide of the invention is the case of composites and polymers filled with an isotropic mineral material (for example calcium carbonate) or anisotropic mineral material, such as fibre (for example glass fibre or carbon fibre). To give an example, the microcrystalline polyamide may contain 30% by weight of fillers such as, for example, glass fibres. This material loses its transparency, becoming opaque. This does not prevent the composition from having two advantages associated with its semicrystalline and microcrystalline character and with its low degree of crystallinity. If such a composition is moulded in a polished mould, the surface finish of the object obtained will not have the roughness defects and unattractiveness characteristic of amorphous polymers or semicrystalline polymers with a high degree of crystallinity and filled with glass fibre, these defects resulting from the random presence of fibres on the surface of the part. By contrast, the polished surface finish of the mould will be better reproduced with our composition and the object will appear smoother and more uniform. Our material, being more malleable, mobile and solidifying more slowly, will allow better arrangement of the fibre. Another advantage is the colour rendering. Consider for example the composition comprising PA-11 No. 6 with 30 parts of glass fibre and 0.5 parts of a grey metallic pigment. The intrinsically transparent nature of our material, combined with the good surface appearance, will bring out the colour and its metallic appearance very much better, like that which a transparent varnish would provide. Thus, a microcrystalline PA-11 filled with 30 parts of glass fibre 0.5 parts of pigment may advantageously replace a PA-6 filled with 30 parts of glass fibre and 0.5 parts of pigment, and even PA-6 filled with 30 parts of glass fibre and then painted (which is expensive and often not very environmentally friendly). This applies for other, non-mineral, fillers, it being understood that these fillers are not in the molten state during manufacture of the object, in other words their melting point is appreciably above that of our microcrystalline polyamide. These fillers may for example be plant-derived fibres or wood. Typically, the mineral or plant-derived fillers are added to the material during a conventional compounding step. These fillers are typically dispersed fillers. However, this does not constitute a limitation, and composites of any shape and any size may be considered.

Microcrystalline polyamide highly filled with mineral powder. To obtain objects with a mineral appearance (of the granite or other stone type), it is possible to use an amorphous transparent polymer such as PMMA and to fill it with 30-80% of mineral powder or filler. It is then given a 3-dimensional shape in order to produce a finished object therefrom, for example a kitchen sink. By using microcrystalline PA instead of PMMA it will be possible to obtain better formability (deep 3-dimensional shape) and it will also be possible to obtain better texturizing (scratch-resistant embossing type, structurizing type, facilitating the flow of water, pleasant feel type and reproducing more faithfully that of stone) and to do so much more easily. Of course, the polyamide highly filled with mineral powder or with pigment is no longer transparent, but its intrinsic transparency means that the colour of the mineral filler or of the pigments comes out more strikingly and attractively.

Microcrystalline polyamide with scratch-resistant and wear-resistant texturization. To obtain scratch-resistant and wear-resistant objects, the intrinsic resistance of the material is not the sole factor. Suitable surface texturing is also beneficial, as is known. Because the microcrystalline PA has a malleable character (but is molten between its $T_g$ and its $T_m$), we are able to use, as texturizing surface, a loose fabric or a mesh. This will be impressed into our material and will leave a surface in negative, that is to say a surface consisting of bumps and grooves. This surface is particularly resistant to wear. Similar effects may be obtained with a paper or an embossed textile. One particularly advantageous situation is that in which glossy bumps and matt valleys with a soft feel are generated. Good visual wear resistance is then combined with a soft feel.

Repairability when hot. Another advantage of the polyamide of the invention, the advantage again being attributable to its semicrystalline and microcrystalline character and to its low (but not too low however) degree of crystallinity, is its ability to be repaired. This is because, should there be a scratch or blemish, it is possible to flame brush its surface and, through the action of the heat, the scratch or blemish will heal or be filled in, without thereby all of the object liquefying or deforming prejudiciously. As an example illustrating the use of this advantage relating to compositions filled with a mineral material, we consider a floor tile filled with 50 parts of calcium carbonate. Owing to the nature of our microcrystalline polymer, we will have the advantage of being easily able to obtain the appearance and feel of quarry stone or, on the contrary, the appearance and feel of polished marble (during the manufacture of the tile between $T_g$ and $T_m$), the advantage of benefiting from the high resistance to mechanical and chemical attack (during use of the object as a floor tile) and finally the advantage of being able subsequently (after the object has been used for a long time) to repair any scratches by heating the tile using the flame of a torch.

Ability to undergo hot reforming. In the previous paragraph we illustrated the ability to repair a small defect of the scratch type. We will now illustrate the ability to correct a large dimensional defect. Let us consider an object made from our microcrystalline PA, for example a smooth sheet 600 microns in thickness decorated by sublimation decoration, but exhibiting a tiling defect, that is to say having a concave shape and a tendency to curl up. To correct this problem, it is sufficient to place the sheet in a forming device, that is to say between two flat polished metal plates, ensuring that the upper plate is sufficiently heavy. The assembly is then heated to a temperature between $T_g$ and $T_m$, for example 80° C., for 8 hours. After cooling, the sheet is removed and observed now to be flat—it is therefore corrected and no longer has the dimensional defect. This correction is not feasible, or only partly feasible, if the material is a conventional semicrystalline polymer—on removing the sheet from the forming device, it will resume, at least partially, its original concave appearance. This return to the original concave state will continue with time or with increasing temperature. With an amorphous polymer, the situation is even more disadvantageous. Above $T_g$, the polymer is liquid, it cannot preserve the integrity of its decoration and it will flow out via the edges between the two plates of the forming device, while below $T_g$ it is much too rigid and will not maintain its concave shape.

Complex Decorated Object Illustrating Various Advantages of the Microcrystalline PA of the Invention Manufacturing step 1: the transparent sheet. The microcrystalline polyamide is extruded and calendered in sheet form. The thickness may for example be between 200 and 800 μm. This polymer material has the advantage of being easy to extrude (it crystallizes and solidifies less quickly on the calendering rolls than a standard semicrystalline polyamide) and of being transparent (a standard PA-11 for example being merely translucent). It is possible to use PA-11 No. 6 for this material.

Manufacturing step 2: sublimation decoration. A coloured decoration (supported on a sheet of paper) and bearing a logo and an inscription in letters and numerals is imparted to the sheet during a sublimation process (the sheet bearing the decoration is pressed against the sheet of microcrystalline polyamide and then heated so that the dyes sublime and pass into the microcrystalline polyamide). This sublimation is usually carried out at around 170° C. for 2 minutes and at 2 bar. This decoration does not cover all of the sheet—there remain undecorated, and therefore colourless and transparent, areas. The sublimed decoration is placed on the lower face of the transparent sheet. It will therefore be protected and the thickness of transparent material that covers it enhances its aesthetic appearance (varnished appearance). With a standard semicrystalline PA-11, it is not advantageous to place the decoration on the lower face, since this material is insufficiently transparent for the decoration, seen from the upper face side, to be properly rendered. With a transparent amorphous PA, the sublimation operation is not possible below $T_g$ (poor penetration of the sublimed pigments) nor above $T_g$ (liquefaction of the sheet). Our microcrystalline material is therefore advantageous.

Manufacturing step 3: thermoforming. The decorated microcrystalline polyamide sheet is then thermoformed into the form of a three-dimensional object (for example car engine cover). The microcrystalline polyamide lends itself particularly well to this hot forming operation, between $T_g$ and $T_m$. In the case of PA-11 No. 6, the operation is carried out at about 170° C. for three minutes.

Manufacturing step 4: overmoulding and finishing. The decorated thermoformed sheet is then placed in an injection mould, the non-decorated face being against the mould wall. This mould wall, on the side facing the future face of the finished object, has a "brushed"-type finish, that is to say it is textured by unidirectional scratches. However, at the centre of this mould wall there is a polished shiny area in the form of a logo. The mould is closed and a standard semicrystalline polyamide (for example PA-12) pigmented metallic grey is then injected. This polyamide (PA-12) is then overmoulded onto the decorated internal face of the microcrystalline polyamide sheet over a thickness of around 1 to 5 mm for example. On removal from the mould, the finished "engine cover" object is obtained. This object is decorated both visually and tactilely.

The following areas of decoration may in fact be observed:
an area of metallic grey colour with the appearance and feel of brushed aluminium (corresponding to an area that is not sublimation decorated);
in the middle of the above area, an area of metallic grey colour with a polished appearance and feel, in the form of a logo;
various coloured areas corresponding to areas sublimation decorated with dark and opaque colours;
various coloured and metalized areas corresponding to areas sublimation decorated with light and translucent colours, and therefore letting through the adjacent metallic pigmentation of the injection-moulded polyamide (PA-12); and
various areas with a logo, letters and numerals, corresponding to the areas thus sublimation decorated.

All these visual decorations are of course protected mechanically, physically and chemically by a thickness of our polymer material. It may therefore be seen that our microcrystalline polyamide material is particularly advantageous for obtaining complex and attractive visuo-tactile decorations. It also allows greater freedom than other materials, such as amorphous polymers, semicrystalline polymers and paints. Paint has the advantage of offering various types of feel (but only one type at a time), but the disadvantage of being limited in terms of visual decoration and protection (letters, numerals, logos). These standard polymers are themselves limited in terms of feel, although advantageous in terms of visual decoration. The microcrystalline PA combines all these advantages.

Examples illustrating Various Processes that Can Be Used to Give Our Material a Texture and a Feel We have already mentioned the IMD (In-mould decoration) process. We now mention, again within the context of the process called thermoplastic injection moulding, various process options for obtaining objects with a feel and a very elaborate and/or unprecedented texturing or a plastic. In general, we consider the injection moulding process in which a film or sheet of our material (whether or not predecorated or pigmented) is placed in the bottom of the mould into which mould a molten polymer is then injected. Our material will warm up, from the heat provided by the molten polymer and by the heat of the mould, will go above its $T_g$ and will soften sufficiently to be capable of assuming the grain of the surface of the mould without in any way melting, aided in this by the high pressure within the medium. We will now consider the possible process variants.

The first inventive variant of the process is to insert, between the mould and the film of our material, a paper or fabric texturizing sheet (or the like). This has the advantage of avoiding having to texturize the metal of the injection mould, and of making it possible to change the texturing very easily without changing mould.

As 2nd variant, it is also possible to use a film of our material that has already been textured (in another operation, at another time) and to use it as texturizing surface for texturing another film of our material. It is therefore very easy to use another solid polymer, and advantageously the same polymer, as texturizing surface. In other words, it is possible to imagine a metal mould with texturizing inserts made of plastic (or any other solid material).

As 3rd variant, it is conceivable to place the texturizing surface elsewhere than in the injection mould, for example in a prior step. We will consider most particularly the inventive variant involving the prior step in which the film of our polymer material is manufactured. Our polymer is melted by an extrusion process and is sheeted out on a chilled roll ("casting" process) or calendered between two chilled rolls ("calendering" process). Upon cooling, our material solidifies, but nevertheless firstly remains sufficiently warm and above its $T_g$. At this moment it is laminated on a fabric or paper texturizing surface (or the like) and subjected to pressure. It will then acquire the texture of this fabric or paper (or the like). Furthermore, the texturizing surface will also act as a protective film for our film. During the subsequent hot manufacturing steps that our film/texturizing surface assembly will undergo, whether a thermoforming operation, a coating operating, a compression moulding operation or an overmoulding operation (as described in the first variants), the texturing of our film will not disappear, but will be further enhanced. It is not essential to texturize during the final hot manufacturing step.

As 4th variant, and as we have already mentioned, we can use thermoplastic conversion processes, either individually or in succession, such as extrusion-lamination, thermoforming, injection moulding with overmoulding.

As 5th inventive variant, we may also use thermosetting conversion techniques. For example, we may line the bottom of a mould with a film of our polymer material and then deposit and cure a thermosetting resin (with its impregnated glass fibre fabric).

As 6th inventive variant, we may use multilayer films or sheets, made from an upper (visible) layer of our microcrystalline material and from a lower layer of a second polymer (and if necessary a tie layer between them). The benefit of this second polymer is to be able to better adhere to a 3rd material, typically a molten polymer (typically introduced during a subsequent overmoulding step), the second polymer being of the same nature as the third or else being compatible with and adherent to it. This may be illustrated with the "microcrystalline PA"/PEBA bilayer film (PEBA=polyether-block-amide, an elastomer; PA=polyamide). This film is placed on the bottom of a shoe sole mould. Molten PEBA is then injected. The adhesion between the molten polymer and the PEBA face of the film is excellent. As a variant, molten TPU (and not PEBA) is then injected. The adhesion between the molten polymer and the PEBA face of the film is excellent. This is also illustrated by a "microcrystalline PA/anhydride-grafted polypropylene/polypropylene" trilayer film which is then overmoulded with polypropylene. This is also illustrated by a "microcrystalline PA/ether-TPU" bilayer film which is then overmoulded with ester-TPU or with PA6. The adhesion between the molten polymer and the PEBA face of the film is excellent. As mentioned above, other processes may be employed. To obtain a PEBA shoe sole, therefore possessing the well-known advantages of PEBA (nerviness, elasticity) and also possessing the visuo-tactile and endurance advantages of microcrystalline polyamide, a microcrystalline PA/PEBA multilayer sheet may be used alone, without overmoulding, by just thermoforming. The ratio of the PA thickness to the PEBA thickness will be adjusted according to the overall compromise of properties sought. Within the same context, knowing that the combination of microcrystalline PA with PEBA elastomer is particularly advantageous in the sports field, blends (alloys or dry blends before processing) of microcrystalline PA and PEBA are particularly beneficial.

As 7th variant we consider a film or sheet in which a small quantity of metal pigments (or those with a metallic appearance, or with a metallizing visual capability) has been dispersed. The sheet remains quite transparent. In a subsequent step, we overmould a polymer tinted light blue. The final part will have a metallic blue appearance with a beautiful depth-wise rendition. The transparent film lightly filled with metal pigment gives a metallic appearance to the blue colour of the substrate. Moreover, the film will mask any defects from injection-moulding the substrate, in particular defects in the flow and dispersion of the light blue pigment in the injection-moulded part. This is because it is difficult to obtain good colour distribution in injection-moulded parts, whereas it is much easier to do so on an extruded film. In fact, it is also possible to consider, as another variant, the use of a coloured opaque film (the colour of the overmoulded substrate will therefore not be seen thereafter). In a rather similar manner, the microcrystalline polyamide sheet may itself consist of various layers (in particular made from this same PA). the upper layer being lightly pigmented by metal pigments, but nevertheless transparent, and the lower layer being highly pigmented with a colour in such a way as to be sufficiently opaque. This multilayer sheet will have an attractive metallic appearance, good depth and, owing to its sufficient opacity, will mask any defects in the substrate, which will then be overmoulded (or undermoulded to be more precise). To accentuate the lacquer and depth effect, it is even possible to envisage an additional upper layer of completely transparent microcrystalline polyamide.

In general, the texturing (and the resulting feel) may be obtained by any warm ($T_g$-$T_m$) process that generates sufficient pressure to press our material (which is solid) against the texturizing surface. Under these conditions, the nature of the microcrystalline polyamide, namely not liquid (otherwise it would stick too much) and not too stiff (otherwise it would not take the texturing), makes it possible to give a polymer material a feel hitherto impossible to obtain with known plastics. It has therefore become possible as it were to "clone" the tactile (and visual) rendition of materials of completely different nature, such as fabric, paper, leather, wood, plants, etc. This advantage may also be combined with other advantages, such as visual decorability and protection properties (wear resistance, impact resistance, UV resistance and chemical resistance). This combination of advantages thus makes it possible in the end (after the manufacturing and finishing steps utilizing the properties of microcrystalline polyamides) to obtain objects of high quality, both perceived and actual. These objects may for example be interior or exterior parts for a vehicle, sports equipment parts, such as shoes and skis, domestic electrical appliance parts, telephone parts, computer cases, furniture, flooring, etc.

Examples of Microcrystalline Compositions that Can Be Used in the Present Invention Blends or alloys of polymers consisting predominantly of C9 and higher polyamide monomers, produced at a high enough temperature such that the resulting polymer is sufficiently transparent. These alloys consist of, on the one hand, a sufficient quantity of crystalline polymer (for example, polyamide-11) for the final alloy to have a melting point and an enthalpy of melting greater than 25 J/g and, on the other hand, a sufficient quantity of amorphous polymer (for example the polymer IPDA.12) for the final alloy to have sufficient transparency:

PA-11+30% PA-BMACM.12
PA-11+30% PA-BMACM.14
PA-11+30% PA-BMACM.14/BMACM.10 (80/20 wt %)
PA-11+30% PA-BMACM.IA/12
PA-11+30% PA-BMACM.IA/BMACM.TA/12
PA-11+30% PA-PACM.12
PA-11+30% PA-IPDA.12
PA-11+30% PA-IPDA.10/12 (80/20 wt %)
PA-11+20% PA-IPDA.10/12 (80/20 wt %)+15% PEBA-12
PA-11+30% PA-10.IA
PA-11+30% PA-10.IA/10.TA

Copolymers consisting predominantly of C9 and higher monomers with, on the one hand, a sufficient quantity of crystalline monomer (for example the 11 monomer unit) for the final copolymer to have a melting point and an enthalpy of melting greater than 25 J/g and, on the other hand, a sufficient quantity of amorphous monomer (for example the monomer unit IPD.10) for the final copolymer to be sufficiently transparent:

90/10 wt % coPA-11/IPDA.10
90/10 wt % coPA-11/IPDA.10.

Polyamide compositions essentially composed of C9 monomers with the best chemical, UV and impact protection properties (least dimensional variations) are preferred. However, it is possible to use blends or alloys of polymers predominantly consisting of C9 and lower polyamide monomers, produced at a sufficient temperature such that the resulting polymer is sufficiently transparent. These alloys consist of, on the one hand, a sufficient quantity of crystalline polymer (for example polyamide-6) for the final alloy to have a melting point and an enthalpy of melting greater than 25 J/g and, on the other hand, a sufficient quantity of amorphous polymer (for example the polymer PA-6,IA) for the final alloy to have sufficient transparency:

PA-6,12+30% PA-IPDA,6/IPDA,10 (70/30 wt %)
PA-6+30% PA-6-3,TA
PA-6+30% PA-6,IA
PA-6+30% PA-6,IA/6,TA
PA-6+30% PA-IPDA,6
PA-6+30% PA-BMACM,6/6 (70/30 wt %)
coPA-6/6,6 (80/20 wt %)+30% PA-6,IA
coPA-6/6,10 (80/20 wt %)+30% PA-6,IA
coPA-6/12 (80/20 wt %)+30% PA-6,IA
coPA-6, TA/6,6+30% PA-6,IA.

Copolymers consisting predominantly of C9 and lower monomers with, on the one hand, a sufficient quantity of crystalline monomer (for example the 6,6 monomer unit) for final copolymer to have a melting point and an enthalpy of melting greater than 25 J/g and, on the other hand, a sufficient quantity of amorphous monomer (for example the monomer unit IPD,6) for the final copolymer to have sufficient transparency:

coPA-6/IPD,6
coPA-6,6/6,T/6,1,10.

Legend:

See above in the text.

PEBA-12: a copolymer comprising PA-12 blocks of 5000 $\overline{M}_n$ and PTMG blocks of 650 $\overline{M}_n$ and an MFI of 4 to 10 (g/10 min at 235° C./1 kg).

The percentages are percentages by weight.

NB: by "crystalline" we mean semicrystalline (no polymer being actually completely crystalline—however it is common practice to use the term "crystalline").

The invention claimed is:

1. A manufacturing process for obtaining an object, said object made of a microcrystalline polyamide or having all or part of its outer surface formed from a said microcrystalline polyamide and having a particular surface finish, said process comprising a thermomechanical treatment carried out between the $T_g$ (glass transition temperature) and the $T_m$ (melting point) of said microcrystalline polyamide, wherein said thermomechanical treatment is chosen from the group consisting of moulding, compression moulding, undermoulding, injection moulding, sheet extrusion/calendering, lamination process, screen printing, thermoforming process, stamping process, in-mould decoration (IMD) process, sintering process, welding process, and wherein the transparency of the microcrystalline polyamide is such that the light transmission at 560 nm on a polished object 1 mm in thickness is greater than 80%.

2. The process according to claim 1, in which the light transmission of the microcrystalline polyamide is greater than 88%.

3. The process according to claim 1, wherein the microcrystalline polyamide is such that its degree of crystallinity is greater than 10% and less than 30% (1st DSC heating according to ISO 11357 at 40° C./min) and the enthalpy of melting is greater than 25 J/g and less than 75 J/g (1st DSC heating according to ISO 11357 at 40° C./min).

4. The process according to claim 1, wherein the microcrystalline polyamide is such that its $T_g$ (glass transition temperature) is between 40° C. and 90° C. and its $T_m$ (melting point) is between 150° C. and 200° C.

5. The process according to claim 1, wherein the microcrystalline polyamide is such that it results from the chain-linking of monomers such that 50% or more, by weight, of these monomers have a number of carbon atoms equal to 9 or higher.

6. The process according to claim 1, wherein the microcrystalline polyamide is a transparent composition comprising, by weight, the total being 100%:

5 to 40% of an amorphous polyamide (B) that results essentially from the condensation of at least one diamine that may be cycloaliphatic, of at least one aromatic diacid and optionally of at least one monomer chosen from:
α,Ω-aminocarboxylic acids,
aliphatic diacids,
aliphatic diamines;
0 to 40% of a polymer (C), wherein polymer (C) is a copolymer having polyamide blocks and polyether blocks;
0 to 20% of a compatibilizer (D) for (A) and (B) wherein (D) is a catalysed polyamide;
a semicrystalline polyamide (A);
(C)+(D) is between 2 and 50%;
with the condition that (B)+(C)+(D) is not less than 30%, and wherein (B)+(C)+(D)+(M)+(A)=100%.

7. The process according to claim 6, in which the polyamide (A) is PA-11 or PA-12.

8. The process according to claim 1, in which the microcrystalline polyamide is such that its enthalpy is greater than 25 J/g (1st DSC heating according to ISO 11357 at 40° C./min) and the transparency of the microcrystalline polyamide is such that the light transmission at 560 nm on a polished object 1 mm in thickness is greater than 80%, the transparency being measured on the object obtained by a process selected from the group consisting of injection moulding, sheet extrusion and calendering.

9. The process according to claim 1, wherein said microcrystalline polymer further comprises a small quantity of pigment dispersed in the microcrystalline polymer to form a microcrystalline polymer composition in such a way that said microcrystalline polymer composition nevertheless remains transparent.

10. The process of claim 1, wherein the object has visuotactile properties.

11. The process according to claim 1, wherein the microcrystalline polyamide also denotes copolyamides, compositions predominantly based on the latter or those in which the microcrystalline polyamide is the matrix constituent.

12. The process according to claim 11, in which the microcrystalline polyamide compositions may be alloys, blends, composites, compositions that include plasticizers, stabilizers, pigments or dyes, mineral fillers, and other miscible polymers that are compatible or are made compatible by a third component.

13. The process according to claim 1, wherein the microcrystalline polyamide is a transparent composition comprising, by weight, the total being 100%:
   a semicrystalline polyamide (A);
   5 to 40% of an amorphous polyamide (B) that results from the condensation:
      of at least one diamine chosen from cycloaliphatic diamines and aliphatic diamines and of at least one diacid, chosen from cycloaliphatic diacids and aliphatic diacids, at least one of these diamines or diacid units being cycloaliphatic,
      or of a cycloaliphatic α,Ω-aminocarboxylic acid,
      or of a combination of these two possibilities, and
   0 to 40% of a polyamide (C), wherein (C) is a copolymer having polyamide blocks and polyether blocks;
   0 to 20% of a compatibilizer (D) for (A) and (B), wherein (D) is a catalyzed polyamide;
   0 to 40% of a modifier (M), wherein (M) is selected from the group consisting of functionalized polyolefins carrying reactive functional groups and grafted aliphatic polyesters;
   with the condition that (C)+(D)+(M) is between 0 and 50%;
   the balance to 100% being said semicrystalline polyamide (A).

14. The process according to claim 13, wherein (M) is selected from the group consisting of:
   copolymers of ethylene with an alkyl(meth)acrylate and/or with a vinyl ester of a saturated carboxylic acid;
   polyolefin chain with polyamide or polyamide oligomer grafted species;
   copolymers of ethylene with an unsaturated epoxide and optionally with an ester or an unsaturated carboxylic acid salt or with a vinyl ester of a saturated carboxylic acid;
   copolymers of ethylene with an unsaturated carboxylic acid anhydride and/or with an unsaturated carboxylic acid that can be partly neutralized by a metal (Zn) or an alkaline metal (Li) and optionally with an ester of an unsaturated carboxylic acid or with a vinyl ester of a saturated carboxylic acid;
   polyethylene, polypropylene, ethylene-propylene copolymers, these being grafted or copolymerized with an unsaturated carboxylic acid anhydride and then condensed with a monoaminated polyamide (or a polyamide oligomer).

15. The process of claim 13, wherein (D) is a catalyzed aliphatic polyamide.

16. The process of claim 13, in which the polyamide (A) is PA-11 or PA-12.

17. The process of claim 1, further comprising a sublimation decoration step, after the step of screen-printing.

* * * * *